United States Patent [19]

Canaday et al.

[11] Patent Number: 5,001,165

[45] Date of Patent: Mar. 19, 1991

[54] POLYOXYALKYLENE SOLUBILIZERS FOR POLYOL BLENDS

[75] Inventors: John S. Canaday, Tampa; Ernest K. Moss, Clearwater, both of Fla.

[73] Assignee: Sloss Industries Corporation, Birmingham, Ala.

[21] Appl. No.: 353,297

[22] Filed: May 17, 1989

Related U.S. Application Data

[63] Continuation of Ser. No. 781,622, Sep. 30, 1985, abandoned.

[51] Int. Cl.[5] .................... C08G 18/32; C08G 18/48; C09K 3/00
[52] U.S. Cl. .................... 521/131; 521/119; 521/167; 521/173; 252/182.25; 252/182.26; 252/182.27
[58] Field of Search .................... 252/182.25, 182.26, 252/182.27; 521/131, 119, 167, 173

[56] References Cited

U.S. PATENT DOCUMENTS

| | | | |
|---|---|---|---|
| 3,034,996 | 5/1962 | Kaplan | 521/107 |
| 3,377,296 | 4/1968 | Dwyer et al. | 521/131 |
| 4,256,802 | 3/1981 | Koehler et al. | 428/310 |
| 4,271,273 | 6/1981 | Biranowski et al. | 521/110 |
| 4,289,858 | 9/1981 | Koehler et al. | 521/131 |
| 4,339,343 | 7/1982 | Koehler et al. | 252/182 |
| 4,439,549 | 3/1984 | Brennan | 521/131 |
| 4,439,550 | 3/1984 | Brennan | 521/131 |
| 4,439,551 | 3/1984 | Yeakey et al. | 521/131 |
| 4,442,238 | 4/1984 | Zimmerman et al. | 521/164 |
| 4,444,915 | 4/1984 | Grube et al. | 521/131 |
| 4,444,917 | 4/1984 | Grube et al. | 521/131 |
| 4,444,918 | 4/1984 | Brennan | 521/131 |
| 4,444,919 | 4/1984 | Brennan | 521/172 |
| 4,444,920 | 4/1984 | Brennan | 521/173 |
| 4,469,821 | 9/1984 | Anderson | 521/131 |
| 4,469,823 | 9/1984 | Yeakey et al. | 521/172 |
| 4,469,824 | 9/1984 | Grigsby, Jr. et al. | 521/173 |
| 4,485,196 | 11/1984 | Speranza et al. | 521/172 |
| 4,518,521 | 5/1985 | Heusch et al. | 252/188.31 |
| 4,529,744 | 7/1985 | Wood | 521/131 |
| 4,540,768 | 9/1985 | Speranza et al. | 528/79 |
| 4,555,418 | 11/1985 | Snider et al. | 252/182.26 |
| 4,595,711 | 6/1986 | Wood | 521/158 |

FOREIGN PATENT DOCUMENTS

| | | |
|---|---|---|
| 0122648 | 10/1984 | European Pat. Off. . |
| 0122649 | 10/1984 | European Pat. Off. . |
| 0044130 | 5/1985 | European Pat. Off. . |
| 1079256 | 8/1967 | United Kingdom . |

OTHER PUBLICATIONS

Cohen, Cartmell and Brown, "Methods of Improving Refrigerant 11 Compatibility in Isocyanurate Systems Containing Waste Stream Aromatic Polyesters"--Proceedings of the SPI, 6th International Technical/Marketing Conference, pp. 101-105, 11/83.

Wood, "The Use of a Unique Aromatic Polyester Polyol in Urethane Modified Isocyanurate Foam Systems," Proceedings of the SPI, 6th International Technical/Marketing Conference, pp. 348-351, 11/83.

Primary Examiner—John Kight, III
Assistant Examiner—Dennis R. Daley
Attorney, Agent, or Firm—James W. Grace

[57] ABSTRACT

Polyol blend compositions are provided containing a polyester polyol, especially an aromatic polyester polyol, a compatibilizing block copolymer of ethylene oxide and at least one other alkylene oxide having three or more carbon atoms in the molecule, the block copolymer being terminated by ethylene oxide blocks, and optionally other polyols. The blends are miscible with halohydrocarbon blowing agents such as trichlorofluoromethane and suitable for reaction with polyisocyanates to give polyisocyanurate and polyurethane foams.

24 Claims, 1 Drawing Sheet

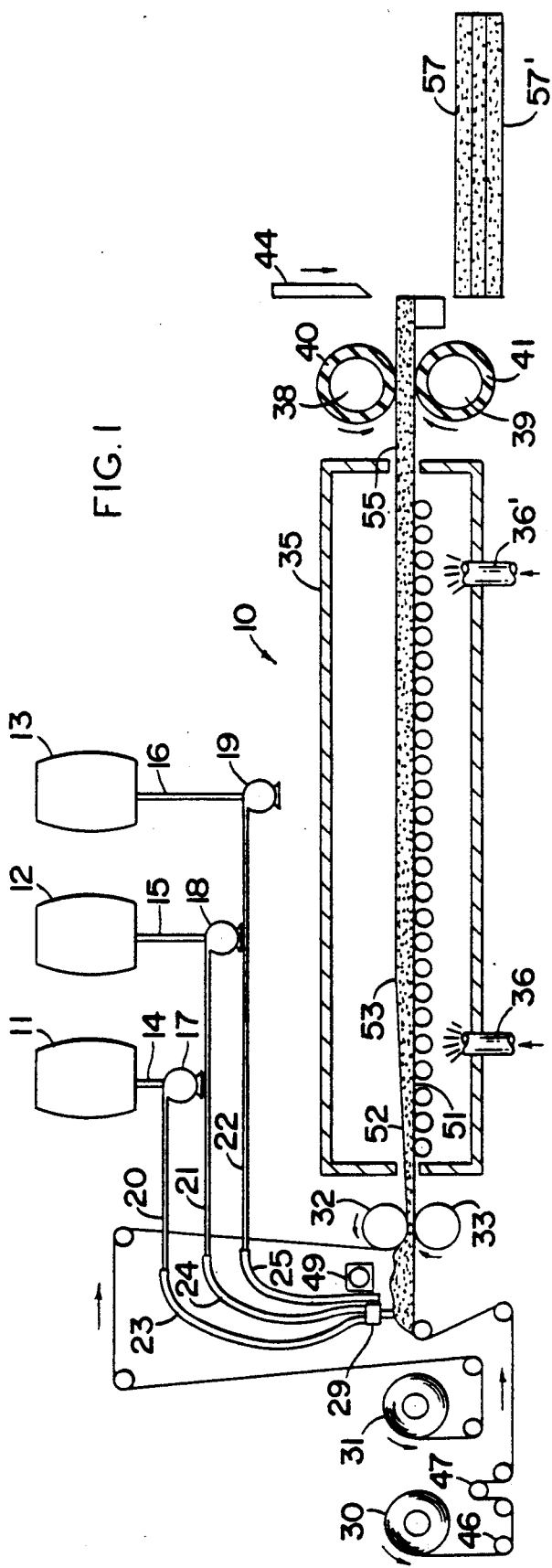
FIG. 1
FIG. 2
FIG. 3

POLYOXYALKYLENE SOLUBILIZERS FOR POLYOL BLENDS

This is a continuation of application Ser. No. 06/781,622, filed Sept. 30, 1985, now abandoned.

BACKGROUND OF THE INVENTION

1. Field of the Invention

This invention relates to storable polyol premixtures for making polymeric foams and more particularly relates to such premixtures for the preparation of polyurethane and polyisocyanurate foams

2. Description of the Prior Art

The use of foamed polyurethanes and polyisooyanurates as thermal insulating materials, packaging foams, etc. is widespread. It is common practice in the manufacture of such cellular foam materials to mix two pre-formulated components, commonly called the A-component and the B-Component. Typically, the A-component contains the isocyanate compound that must be reacted with the constituents of the B-component to form the foam, and the B-component commonly contains the balance of the foam ingredients, namely, polyol, blowing agent, surfactant and catalyst.

An inexpensive source of polyols for foam insulation systems is now available through the use of waste stream aromatic polyesters and aromatic polyesters reclaimed from bottles, film scrap, eto. Unfortunately, these polyols suffer the disadvantage of incompatibility with the fluorocarbon blowing agents commonly employed in the production of the foams. While the problem can be partially overcome by combining the aromatic polyester polyols with various polyol types conventionally used in foam production, this approach detracts from the desirable foam properties, such as good flame resistance, and cost reduction associated with use of the aromatic polyols Another approach is to add compatibilizing agents as fluorocarbon solubility aids. The latter approach is exemplified in U.S. Pat. No. 4,529,744, wherein a dual compatibilizer system is needed to provide the disclosed miscible blends of polyol and blowing agent.

Therefore, there still is a need for simple and inexpensive ways of promoting the compatibility of polyols, especially aromatic polyester polyols, with fluorocarbon blowing agents and thereby providing homogeneous and storable polyol blends for use in manufacturing foams of good quality and low cost.

OBJECTS OF THE INVENTION

It is accordingly an object of the present invention to provide a compatible blend of polyester polyol, especially aromatic polyester polyol, and fluorocarbon blowing agent materials which is further characterized by good storage stability and a workable viscosity.

It is another object of the present invention to provide for use of the compatible blend in producing polyisocyanurate and polyurethane foams having a combination of advantageous properties, including a reduced friability, and high thermal resistance, compressive strength, and dimensional stability.

It is a further object of the present invention to provide improved rigid cellular foams, especially polyisocyanurate and polyurethane foams, having a combination of advantageous properties, including a reduced friability, and high thermal resistance, compressive strength, and insulation properties, and an improved method of producing the foams.

It is an additional object of the present invention to produce an improved rigid polyisocyanurate foam material characterized by a high degree of fire resistance with low smoke evolution and flame spread on combustion, and the formation of a protective char over unburnt foam upon combustion.

It is a still further object of the present invention to provide closed cell polyisocyanurate and polyurethane foam materials which can be used in building panels which are highly insulating, thermally resistant, low in friability, soundproof and self-supporting.

These and other objects and advantages of the present invention will become more apparent by reference to the following detailed description and drawings wherein:

FIG. 1 is a side schematic representation of an apparatus suitable for producing a cellular foam material in accordance with the present invention;

FIG. 2 is a cross-sectional view of a laminated building panel having one facing sheet; and FIG. 3 is a cross-sectional view of a laminated building panel having two facing sheets.

DESCRIPTION OF THE INVENTION

The above objects have been achieved and the drawbacks of the prior art have been overcome by the development of liquid polyol blends which are suitable for making polyurethane and polyisocyanurate polymers, and especially rigid cellular foams of these polymers. The polyol blends of the invention comprise a mixture of a polyester polyol and a compatibilizing agent which renders the polyester polyol highly miscible with fluorocarbon blowing agents. The compatibilizing agent comprises a block copolymer of ethylene oxide and an alkylene oxide which contains at least three carbon atoms in the molecule, wherein the polyoxyalkylene chains of the copolymer are terminated by ethylene oxide blocks. The compatibilizing polyoxyalkylene polyols suitably have a relatively high molecular weight for enhanced efficiency in the blends of the invention.

The block copolymers may be made in known manner, for example, by heating together at 100° C.–150° C. and 5–80 lb/sq. in. pressure, preferably in the presence of a catalyst, an alkylene oxide containing at least three carbon atoms in the molecule and a compound containing at least one active hydrogen atom in the molecule and then subsequently reacting with ethylene oxide. The alkylene oxide containing at least three carbon atoms in the molecule is preferably 1,2-propylene oxide but other alkylene oxides such as 1,2-butylene oxide, 2,3-butylene oxide or styrene oxide may be used. Suitable catalysts for the polymerization include strong bases such as potassium hydroxide and acidic materials such as boron trifluoride and stannic chloride. The active hydrogen-containing compound may be, for example, isooctanol, phenol, acetic acid, water, ethylene glycol or a compound of higher functionality, for example, glycerol, pentaerythritol, ethylene diamine or sorbitol. The active hydrogen-containing compound preferably has a functionality of 2–8, more preferably 2–4. The block copolymers of the invention accordingly may be assigned the formula:

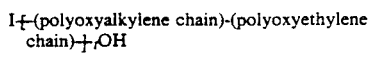

wherein I is the residue of the initiator, the polyoxyalkylene chain contains units other than oxyethylene units, and t has a value from 2 to 8.

The block copolymers generally have an average equivalent weight from about 500 to 7000, and preferably from about 1000 to 4000, more preferably 1500 to 2500. The proportion of terminal oxyethylene units in the molecule may be from about 10% to 90%, preferably 30% to 80%, by weight based on the weight of the copolymer. More preferably, the compatibilizers comprise block copolymers of ethylene oxide and propylene oxide which contain from about 30% to 80%, most preferably 10% to 70%, by weight of endcapping oxyethylene units based on the weight of the copolymer. The preferred block copolymers thus have one or more inner poly(propylene-oxy) (PO) blocks endcapped by poly(ethylene-oxy) (EO) blocks.

Highly stable polyol blends have been achieved by using a relatively low concentration of EO/PO block copolymers having an EO content of 40 weight % or greater and an equivalent weight of 1700 or greater. Also, higher concentrations of those EO/PO copolymers having the same EO content but lower equivalent weight will provide stable blends. Blend viscosity increases as the EO level of the compatibilizer increases. While the use of block copolymers containing up to 70 weight % EO results in highly stable blends, those copolymers containing about 40–50 weight % EO provide both excellent stability and easily manageable viscosity.

Particularly suitable compatibilizers are the linear polyoxyalkylene polyols based on propane-diols, supplied under the name "Pluronics" by BASF Wyandotte Corporation. The Pluronic polyols of the invention are block copolymer condensates of ethylene oxide with the hydrophobic base formed by condensing propylene oxide with propylene glycol to yield a central block of propylene oxide units with ethylene oxide blocks on each end. They have a molecular weight in the range of about 1000 to about 14,000, and may be ascribed the structure:

$$HO(C_2H_4O)_a(C_3H_6O)_b(C_2H_4O)_cH$$

wherein b is an integer sufficiently high to provide a molecular weight of at least about 900 for the oxypropylene base and wherein a+c is an integer sufficiently high to provide 5 to 90% of the total molecular weight of the compound.

Exemplary designations of these copolymers are Pluronic L44, Pluronic P65 and Pluronic F77, where the letters L, P and F before the numbers in the name of each polyol represent the physical form of the polyol:- liquid, paste or flaky solid. The last digit of the numbers represents the approximate weight percent of ethylene oxide contained in the polyol divided by 10. Pluronics P65 and P75, which contain 50 weight % EO, are preferred compatibilizers of the invention.

Another highly useful class of block copolymers comprises the so-called "Tetronics" available from BASF Wyandotte Corporation. The Tetronic polyols are formed by the addition of propylene oxide to ethylene diamine, followed by the addition of ethylene oxide. They have a molecular weight in the range of about 1,650 to about 27,000, and are ascribed the structure:

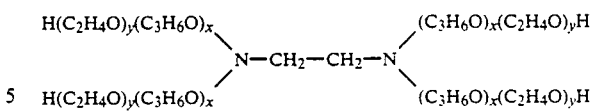

wherein x is sufficiently large to provide a molecular weight of the oxypropylene chains of at least about 250 and wherein y is sufficiently large to provide about 10 to 90% of the total molecular weight of the compound.

Tetronic 1104, which contains 40 weight % EO, is a preferred compatibilizer of the invention.

The disclosure of U.S. Pat. No. 3,337,463 with respect to Pluronic and Tetronic compounds is hereby incorporated by reference.

The polyester polyols useful in the invention can be prepared by known procedures from polycarboxylic acids such as adipic, sebacic, glutaric, phthalic, halogenated phthalic, hydrogenated phthalic, succinic, maleic, fumaric and the like, and polyols such as ethylene glycol, trimethylolpropane, glycerol, sorbitol, polypropylene glycol and the like. Aromatic polyester polyols are especially preferred.

The polyester polyols contain at least two hydroxyl groups and generally have a molecular weight of from about 150 to 5,000. Preferably, the polyesters contain from 2 to 8 hydroxyl groups and have a molecular weight of from about 220 to 800, more preferably from about 270 to 400. The acid component of these polyesters advantageously comprises sufficient phthalic acid residues for enhanced fire retardant properties and low smoke generation in the case of combustion. Polyesters whose acid component comprises at least 40% by weight of such residues are particularly useful. By phthalic acid residue is meant the group

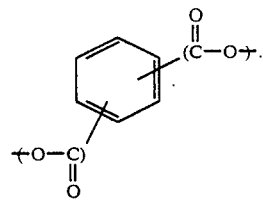

These polyesters include, for example, reaction products of polyhydric, preferably dihydric and optionally trihydric, alcohols with phthalic acids and other polybasic, preferably dibasic, carboxylic acids. Instead of using the free phthalic acids or polycarboxylic acids, the corresponding acid anhydrides or corresponding acid esters of lower alcohols or mixtures thereof may be used for preparing the polyesters. O-phthalic acids, isophthalic acids and/or terephthalic acids may be used as the phthalic acid. The optional polybasic-carboxylic acids may be aliphatic, cycloaliphatic, aromatic and/or heterocyclic and may be substituted, for example, with halogen atoms and/or may be unsaturated. The following are mentioned as examples: succinic acid, adipic acid, suberic acid, azelaic acid, sebacic acid, trimellitic acid, tetrahydrophthalic acid anhydride, hexahydrophthalic acid anhydride, endomethylene tetrahydro phthalic acid anhydride, glutaric acid anhydride, maleic acid, maleic acid anhydride, fumaric acid, and dimeric and trimeric fatty acids, optionally mixed with monomeric fatty acids. Suitable polyhydric alcohols include, for example, ethylene glycol, propylene glycol-(1,2)

and -(1,3), octane diol-(1,8), neopentyl glycol, cyclohexane dimethanol, (1,4-bis-hydroxymethylcyclohexane), 2-methyl-1,3-propane diol, glycerol, trimethylolpropane, hexanetriol-(1,2,6), butane triol-(1,2,4), trimethylolethane, pentaerythritol, quinitol, mannitol and sorbitol, methylglycoside, diethylene glycol, triethylene glycol, tetraethylene glycol, polyethylene glycols, dipropylene glycol, polypropylene glycols, dibutylene glycol, and polybutylene glycols. The polyesters may also contain carboxyl end groups. Polyesters of lactones such as ε-caprolactone, or hydroxycarboxylic acids, such as ω-hydroxycaproic acid, may also be used.

While the polyester polyols can be prepared from substantially pure reactant materials, more complex ingredients may be used, such as waste or scrap residues from the manufacture of phthalic acid, terephthalic acid, dimethyl terephthalate, polyethylene terephthalate, adipic acid and the like. Preferred raw materials contain compounds having the above defined phthalic acid residues.

A preferred hydroxy terminated aromatic polyester for use in the present invention is prepared by the transesterification, with a glycol of molecular weight from about 60 to about 400, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids. This residue is described in U.S. Pat. No. 3,647,759, and suitable transesterified polyol mixtures are described in U.S. Pat. No. 4,237,238, the disclosures of which patents are hereby incorporated by reference. Two preferred transesterifying glycols which can be reacted with the residue are ethylene glycol and diethylene glycol, with the latter being more preferred. Examples of transesterified residues which can be used in accordance with the invention are those supplied by Hercules, Inc., Wilmington, Del. under the trade name of Terate ® resins An excess of the transesterifying glycol advantageously may be used to react with the residue defined above. The amount of this preferred excess of transesterifying glycol remaining in the transesterified polyol mixture can vary broadly but suitably falls within a range of from about 5 to about 30 percent by weight of said polyol mixture.

Another preferred aromatic polyester polyol which can be employed is prepared by the transesterification, with a glycol of molecular weight from about 60 to 400, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials. An expecially useful polyol mixture can be prepared by transesterifying a by-product fraction from the manufacture of dimethyl terephthalate comprising a mixture of (a) about 40 to 60 percent by weight of dimethyl terephthalate,
(b) about 1 to 10 percent by weight of monomethyl terephthalate,
(c) about 1 to 2 percent by weight of terephthalic acid,
(d) about 10 to 25 percent by weight of bi-ring esters,
(e) about 5 to 12 percent by weight of organic acid salts,
(f) about 18 to 25 percent by weight of polymeric materials, and
(g) about 1 to 4 percent by weight of ash.

An excess of the transesterifying glycol is advantageously used to react with the by-product fraction. Two preferred glycols for transesterifying the by-product fraction are ethylene glycol and diethylene glycol, with the latter being more preferred. The properties of the polyol mixture produced by the transesterification are described in U.S. Pat. No. 4,411,949, the disclosure of which is hereby incorporated by reference. An example of this transesterified by-product fraction of the invention is the product supplied by Jim Walter Resources, Inc. under the trademark Foamol 250.

Still other preferred aromatic polyester polyols are those produced by digesting polyalkylene terephthalate, especially polyethylene terephthalate (PET), residues or scraps with organic polyols, such as the digestion products disclosed in U.S. Pat. Nos. 4,223,068, 4,417,001 and 4,469,824 and European Patent Application No. 83102510.1.

Especially preferred are those polyols prepared by digesting polyalkylene terephthalate polymers with a polycarboxylic acid component-containing polyol derived from a digesting polycarboxylic acid component and a digesting polyol component. Advantageously, the polycarboxylic acid component has ring units with two

groups on adjacent (or ortho) or alternate (or meta) ring positions. Examples of suitable polycarboxylic acid components are phthalic anhydride, phthalic acid, isophthalic acid, trimellitic anhydride, trimellitic acid, benzophenonetetracarboxylic dianhydride, esters of these polycarboxylic acid components and mixtures thereof. Suitable digesting polyol components include glycols, such as diethylene glycol, dipropylene glycol, mixtures of these glycols and their mixtures with at least one other oxyalkylene glycol.

When PET is digested by the polycarboxylic acid component-containing polyol, it has been found advantageous to distill from the resultant digested polyol mixture sufficient ethylene glycol liberated in the digestion to improve the storage stability of the mixture. The polycarboxylic acid component-containing polyol preferably includes at least one glycol which is co-distillable with the liberated ethylene glycol, and the distillation is conducted to distill from the digested polyol mixture the amount of liberated ethylene glycol and co-distillable glycol sufficient for improved storage stability of the mixture. The distillation advantageously is conducted rapidly at reduced temperature and pressure to prevent or minimize the liberation of further ethylene glycol from the polyethylene terephthalate during the distillation. A most preferred distilled polyol mixture is prepared with a digesting medium derived from phthalic anhydride and diethylene glycol, and is characterized by an equivalent weight of 100-250 grams/equivalent of OH, a low free ethylene glycol content, e.g., less than 1%, preferably less than 0.5%, by weight, and a free diethylene glycol level in the 3 to 30 weight % range.

U.S. Pat. No. 4,539,341 and patent application Ser. No. 756,107 describe the preparation and properties of preferred digestion and distillation products obtained through use of the polycarboxylic acid component-containing digesting medium. The disclosures of this patent and application are hereby incorporated by reference.

The compatibilizing block copolymers of the invention greatly enhance the usefulness of polyester polyols, especially aromatic polyester polyols, in the preparation of rigid urethane and isocyanurate foam. The loading of polyester polyol in fluorocarbon-containing premixes for preparing foam can be substantially increased because of the solubilizing influence of the compatibilizers. The compatibilized premixes also can include other conventional polyols, such as other polyether polyols, and other additives customarily used in foam production, such as catalysts, flame retardants, etc.

The polyol blend of the invention advantageously comprises
(a) about 10 to 95%, preferably 70 to 90%, by weight, of polyester polyol (especially aromatic polyester polyol),
(b) about 1 to 50%, preferably 10 to 30%, by weight, of compatibilizing block copolymer,
(c) about 0 to 35%, preferably 5 to 20%, by weight, of an alkylene glycol having the formula

where R is hydrogen or lower alkyl of one to four carbon atoms and n is from 1 to 10, preferably 2 to 10, and more preferably 2 to 3, and
(d) about 0 to 70%, preferably 0 to 30%, by weight, of at least one other polyol of the type conventionally used in making rigid polyurethane and polyisocyanurate foams.

Alkylene glycols of formula (A) are especially useful in the transesterification and digestion of dimethyl terephthalate residues, PET scrap, and the like. Additional glycol may be added after the transesterification and digestion procedures for appropriate adjustment of the equivalent weight. Examples of the alkylene glycols are ethylene glycol, propylene glycol, diethylene glycol, dipropylene glycol, triethylene glycol, tripropylene glycol and tetrapropylene glycol, among others, and mixtures thereof. Especially suitable glycols are diethylene and dipropylene glycols. compatibilizers of high EO content are helpful in solubilizing premixes containing glycols such as diethylene glycol.

The other polyols which can be employed in the polyol blend of the invention include, besides monomeric polyols, polyether polyols other than those included under formula (A) and the compatibilizing EO/PO block copolymers of the invention. These other polyether polyols are found particularly useful in preparing rigid polyurethane foams. Polyether polyols of this type are the reaction products of a polyfunctional active hydrogen initiator and a monomeric unit such as ethylene oxide, propylene oxide, butylene oxide and mixtures thereof, preferably propylene oxide, ethylene oxide or mixed propylene oxide and ethylene oxide. The polyfunctional active hydrogen initiator preferably has a functionality of 2–8, and more preferably has a functionality of 3 or greater (e.g., 3–8).

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, hexanetriol, polypropylene glycol, glycerine, sorbitol, trimethylolpropane, pentaerythritol, sucrose and other carbohydrates. Such amines or alcohols may be reacted with the alkylene oxide(s) using techniques known to those skilled in the art. The hydroxyl number which is desired for the finished polyol would determine the amount of alkylene oxide used to react with the initiator. The polyether polyol may be prepared by reacting the initiator with a single alkylene oxide, or with two or more alkylene oxides added sequentially to give a block polymer chain or at once to achieve a random distribution of such alkylene oxides. The polyether polyols generally have an average equivalent weight from about 80 to 10,000 and preferably have an average equivalent weight from about 100 to about 6000. Polyoxypropylene glycols having molecular weights from about 200 to about 4000 corresponding t.o equivalent weights from about 100 to 2000 and mixture thereof are particularly useful as polyol reactants. Polyol blends such as a mixture of high molecular weight polyether polyols with lower molecular weight polyether polyols can also be employed.

The polyol blends of the present invention may be used in the preparation of both cellular and non-cellular polymers. The latter polymers, such as the polyisocyanurates and polyurethanes, can be prepared by using standard techniques known to those skilled in the art. The polyol blends are particularly useful in the preparation of polyisocyanurate foams and polyurethane foams. These foams can be prepared by mixing together the organic polyisocyanate with the polyol(s), catalyst and blowing agent at temperatures ranging from about 0° C. to 150° C.

The polyurethane foams can be prepared by reacting the polyol blend of the invention and polyisocyanate on an essentially 1:1 to 1:1.2 equivalent basis. The polyisocyanurate foams of the invention are prepared by reacting the polyisocyanate with a minor amount of the polyol blend, such as sufficient polyol blend to provide about 0.10 to 0.55 hydroxyl equivalents of said blend per equivalent of said polyisocyanate.

In the broadest aspects of the present invention, any organic polyisocyanate can be employed in the preparation of the foams of the present invention. The organic polyisocyanates which can be used include aromatic, aliphatic and cycloaliphatic polyisocyanates and combinations thereof. Representative of these types are the diisocyanates such as m-phenylene diisocyanate, toluene-2, 4-diisocyanate, toluene-2,6-diisocyanate, mixtures of 2,4- and 2,6-toluene diisocyanate, hexamethylene-1,6-diisocyanate, tetramethylene-1,4-diisocyanate, cyclohexane-1,4-diisocyanate, hexahydrotoluene 2,4- and 2,6-diisocyanate, naphthalene-1,5-diisocyanate, diphenyl methane-4,4'-diisocyanate, 4,4'-diphenylenediisocyanate, 3,3'-dimethoxy-4,4'-biphenyldiisocyanate, 3,3'-dimethyl-4, 4,4'-diisocyanate; the triisocyanates such as 4,4',4"-triphenylmethanetriisocyanate, polymethylenepolyphenyl isocyanate, toluene-2,4,6-triisocyanate; and the tetraisocyanates such as 4,4'-dimethyldiphenylmethane-2,2',5,5'-tetraisocyanate. Especially useful are polymethylene polyphenyl polyisocyanates. These isocyanates are prepared by conventional methods known in the art such as the phosgenation of the corresponding organic amine.

While any blowing agent (e.g., water) typically employed in similar prior art foam products containing polyisocyanurate and/or polyurethane linkages can be employed in the foam compositions of the present invention, the singular finding of this invention is that the compatibility of halogenated organic, especially fluorocarbon, blowing agents with aromatic polyester polyols and particularly aromatic polyester polyols derived from waste stream or scrap sources is substantially improved by use of small amounts of the block copolymer compatibilizer described herein. By using this EO/PO block copolymer, compatibility between the polyol and fluorocarbon blowing agent components employed in manufacturing rigid polyisocyanurate and polyurethane foam is sufficiently improved so that with normal production techniques as much as about 40 to 95 weight % of the polyol may be aromatic polyester polyol. This allows full advantage to be taken of the tendency of the aromatic polyester polyol to produce rigid foams of low friability, k-factor, flammability and cost.

The fluorocarbon blowing agent can be any of the fluorocarbons known to those skilled in the art as useful for blowing polymer mixtures into foams. In general, these blowing agents have an atmospheric pressure boiling point between minus 50° and 100° C. and preferably between zero and 50° C. Such blowing agents can be, if desired, substituted by chlorine and/or bromine in addition to the fluorine content. A preferred class of fluorocarbons are the fluorinated alkanes. Examples of fluorocarbon blowing agents are trichlorofluoromethane, monochlorodifluoromethane, dichlorodifluoromethane, dichloromonofluoromethane, $CCl_2FCClF_2$ and $CCl_2FCF_3$. Mixtures of fluorocarbon blowing agents can be employed. Trichlorofluoromethane is a preferred blowing agent.

The blowing agents are employed in an amount sufficient to give the resultant foam the desired bulk density which is generally between 0.5 and 10, and preferably between 1 and 5 pounds per cubic foot. Miscible polyol blends result when a fluorocarbon blowing agent is combined with the compatibilizer-containing polyol mixtures of the invention. The compatibilizer level will depend on the desired level of the particular fluorocarbon. For example, at 20-25% trichlorofluoromethane, the compatibilizer level can be about 10-20%, while 30-35% of this fluorocarbon requires more compatibilizer, such as 15-25%. The particular fluorocarbon and polyols and percentages of each to be employed in any specific polyol blend for maximum miscibility can be easily determined by one skilled in the art by a process of trial and error. In accordance with the present invention, there can be obtained miscible polyol blends comprising from about 10, preferably 25, percent by weight to about 50, preferably 35, percent by weight of fluorocarbon blowing agent and correspondingly from about 90, preferably 75, percent by weight to about 50, preferably 65, percent by weight of the polyol blend of components (a)–(d) recited above.

Any suitable surfactant can be employed in the foams of this invention. The surfactant may be included in the polyol blend. However, it has been found that in some cases the compatibilizing block copolymers themselves display cell stabilizing effectiveness and therefore can either eliminate or reduce the requirement for an additional surfactant. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "L-5420" and "L-5340" and from the Dow Corning Corporation under the trade name "DC-193".

Other suitable surfactants are those described in U.S. Pat. Nos. 4,365,024 and 4,529,745 and supplied by Jim Walter Resources, Inc. under the trademarks Foamstab 100 and 200. Generally, the surfactant comprises from about 0.05 to 10, and preferably from 0.1 to 6, weight percent of the foam-forming composition.

In a preferred embodiment of the invention, the polyol blend additionally includes any of the catalysts conventionally employed in the art to catalyze the reaction of an isocyanate with a reactive hydrogen containing compound in foam preparations. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1, 3,3-tetramethylguanidine, N,N,N',N'-tetramethyl-1,3-butanediamine, N,N-dimethylethanolamine, N,N-diethylethanolamine, and the like. The catalysts generally comprise from about 0.1 to 5, preferably from about 0.5 to 3, weight percent, with the balance of about 99.9 to 95, preferably about 99.5 to 97, weight percent, comprising the blend of polyols (a)–(d) and blowing agent set forth above.

Minor amounts (typically less than about 15 wt. %) of other optional additives can be added to the blend composition of this invention without detracting from blend miscibility and stability. Such other additives include, for example, nonreactive and reactive flame retardants, such as tris(2-chloroethyl)-phosphate, dispersing agents, plasticizers, fillers and pigments.

A typical viscosity range for the blend composition of the invention is about 1000–6000 cps at 20° C.

In a preferred rigid foam of the invention containing polyisocyanurate linkages, the organic polyisocyanate is polymethylene polyphenylisocyanate. The polymethylene polyphenylisocyanates desirably have a functionality of at least 2.1 and preferably 2.5 to 3.2. These preferred polymethylene polyphenylisocyanates generally have an equivalent weight between 120 and 180 and preferably an equivalent weight between 130 and 145. The friability of foams made with these polyisocyanates is desirably less than 30%, preferably less than 20%.

A preferred subclass of polymethylene polyphenylisocyanates especially useful in the present invention is a mixture of those of the following formula:

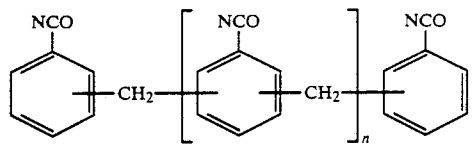

wherein n is an integer from 0 to 8 and wherein the mixture has the above-described functionality and equivalent weight. This mixture should have a viscosity between 100 and 4,000 and preferably 250 to 2500 centipoises measured at 25° C. in order to be practical for use in the present invention.

Examples of suitable polymethylene polyphenylisocyanates useful in the present invention include those of the above formula, wherein n is 1 as well as mixtures wherein n can have any value from 0 to 8 as long as the mixture has the specified equivalent weight. One such mixture has 40 weight percent of n=0, 22 weight percent of n=1, 12 weight percent of n=2, and 26 weight percent of n=3 to about 8. The preferred polymethylene polyphenyl isocyanates are described in U.S. application Ser. No. 322,843, filed Jan. 11, 1973, now abandoned. The synthesis of polymethylene polyphenylisocyanates is described in Seeger et al., U.S. Pat. No. 2,683,730 and in Powers U.S. Pat. No. 3,526,652 at column 3, lines 6-21. It should, therefore, be understood that the polymethylene polyphenylisocyanates available on the market under the tradenames of CODE 047 or PAPI-20 (Upjohn) and MR 200 (Mobay) can successfully be employed within the spirit and scope of the present invention.

In order to ensure complete reaction of isocyanurate foams, the polymethylene polyphenylisocyanate and the polyol are generally mixed in an equivalent ratio of 1.5:1 to 6:1 and preferably 2:1 to 5:1. In ranges outside these proportions the reaction tends to yield a product having less desirable physical characteristics.

In the preparation of the polyisocyanurate rigid foams, any catalysts known to catalyze the trimerization of isocyanates to form isocyanurates, and to catalyze the reaction of isocyanate groups with hydroxyl groups to form polyurethanes, can be employed. The preferred catalysts give cream times of 15 to 30 seconds and firm times of 25 to 80 seconds. One preferred type of catalyst is a mixture of a tertiary amino phenol, such as 2,4,6-tris(dimethylaminomethyl)phenol, and an alkali metal carboxylate, such as potassium-2-ethyl hexoate, the synthesis and use of which are described in U.S. Pat. No. 4,169,921. The disclosure of this patent is hereby incorporated by reference. The equivalent ratio of tertiary amino phenol to alkali metal carboxylate in the cocatalyst composition is desirably about 0.4:1 to 2.5:1. Another catalyst system is that employing an epoxide, an N-substituted aziridine, and a tertiary amine. The synthesis and use of such a catalyst are described in U.S. application Ser. No. 251,279, filed May 8, 1972, now U.S. Pat. No. 3,799,896. The catalysts generally comprise from 0.1 to 20 and preferably from 0.3 to 10 weight percent of the total composition.

Referring now to the drawings, and in particular to FIG. 1, there is shown schematically an apparatus 10 suitable for use in connection with the present invention. The apparatus 10 comprises an isocyanate tank 11, a polyol blend tank 12, and a catalyst tank 13, each respectively connected to outlet lines 14, 15, and 16. The lines 14, 15, and 16 form the inlet to metering pumps 17, 18, and 19. The pumps 17, 18, and 19 discharge respectively through lines 20, 21, and 22 which are in turn respectively connected to flexible lines 23, 24, and 25. The flexible lines 23, 24, and 25 discharge to mixing head 29. The apparatus 10 is also provided with a roll 30 of lower substrate material and a roll 31 of upper substrate material. The apparatus 10 is also provided with metering rolls 32 and 33, and an oven 35 provided with vents 36, 36' for blowing hot air. The apparatus 10 is also provided with pull rolls 38, 39 and cutting knife 44.

In the production of a laminate of a polyisocyanurate foam, the isocyanate tank 11 is charged with the organic polyisocyanate, and the polyol blend tank 12 is charged with the miscible polyol blend of the invention containing the polyols (including compatibilizer) and fluorocarbon, and optionally flame retardant and surfactant, and the catalyst tank 13 is charged with the catalyst composition. The catalyst composition instead may be charged to the polyol blend tank. The speeds of the pumps 17, 18, and 19 are adjusted to give the desired ratios of the ingredients in the tanks 11, 12, and 13. These ingredients pass respectively through lines 20, 21, and 22 as well as lines 23, 24, and 25, whereupon they are mixed in the mixing head 29 and discharged therefrom. Alternatively, lines 21 and 22 can be combined prior to the mixing head. The pull rolls 38, 39, each of which has a flexible outer sheath 40, 41 are caused to rotate in the direction of the arrows by a power source (not shown). By virtue of rotation of the pull rolls 38, 39 lower substrate material is pulled from the roll 30, whereas upper substrate material is pulled from the roll 31. The substrate material passes over idler rollers such as idler rollers 46 and 47 and is directed to the nip between metering rolls 32, 33. The mixing head 29 is caused to move back and forth, i.e. out of the plane of the paper by virtue of its mounting on reversible mechanism 49. In this manner, an even amount of material can be maintained upstream of the nip between the metering rolls 32, 33. The composite structure at this point now comprising a lower substrate 51, an upper substrate 52 on either side of a core 53, now passes into the oven 35. While in the oven 35 the core expands under the influence of heat added by the hot air from vents 36, 36' and due to the heat generated in the exothermic reaction between the polyol mixture and the isocyanate in the presence of the catalyst. The temperature within the oven is controlled by varying the temperature of the hot air from vents 36, 36', in order to insure that the temperature within the oven 35 is maintained within the herein described limits. The composite structure 55 then leaves the oven 35, passes between the nip of the pull rolls 38, 39 and is cut by knife 44 into individual panels 57, 57'.

Numerous modifications to the apparatus 10 will be immediately apparent to those skilled in the art. For example, the tanks 11, 12, and 13 can be provided with refrigeration means in order to maintain the reactants at subambient temperatures.

Referring to FIG. 2 of the drawings, there is shown a laminated building panel 60 of the invention. The building panel 60 comprises a single facing sheet 61 having thereon a cellular material 62 of the present invention. FIG. 3 shows a building panel 70 having two facing sheets 71 and 72 on either side of a cellular material 73.

Any facing sheet previously employed to produce building panels can be employed in the present invention. Examples of suitable facing sheets include, among others, those of kraft paper, aluminum, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference. The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

Preparation of Aromatic Polyester Polyols

This example illustrates the preparation of aromatic polyester polyols from digested scrap polyethylene terephthalate.

A. Preparation of Digested and Distilled Polyol

To a 1 l resin kettle equipped with a stirrer, thermometer, inlet and outlet for nitrogen, Vigreaux column, reflux condenser and collector were added 580 g of diethylene glycol (DEG), 148 g of phthalic anhydride (PA), and ca. 1 ml of tetrapropyl titanate by means of a syringe. The ingredients were flushed with nitrogen, heated to 230° C. and held at this temperature until the water of reaction ceased to condense in the collector. At this point, 346 g of polyethylene terephthalate (PET) chips were added, and the temperature dropped to 180°-190° C. The charge had a total glycol:total acid mole ratio of 2.6 and a PET:PA mole ratio of 1.8. The temperature of the charge was again raised to 230° C. and held at this temperature for 1.5 hours.

The resultant digested polyol mixture was filtered and distilled by means of a Pope Scientific 2" concentrator/evaporator equipped with a variable speed drive, digital RPM indicator, and an Omega Engineering temperature controller. Distillation was performed with a jacket temperature of 180° C., a vacuum of ca. 22 mm Hg, and a flow rate of about 0.25 g/sec. to yield a product (Polyol No. 1) having an equivalent weight of 213 g/equivalent of OH, a free ethylene glycol (EG) content of <0.5%, a free DEG content of 4.9%, and a viscosity of 9400 cps at 25° C.

Additional DEG was blended with Polyol No. 1 to give the two following polyol mixtures:

| Polyol No. | Eq. Wt. | % EG | % DEG | Viscosity cps, 25° C. |
|---|---|---|---|---|
| 2 | 175 | <.5 | 12.4 | 3300 |
| 3 | 140 | <.5 | 19.7 | 1300 |

B. Preparation of Digested but Undistilled Polyol

The digestion procedure of Example 1A was repeated except that 425 g of DEG, 170 g of PA, and 425 g of PET chips were used. This charge had a total glycol:total acid ratio of 1.85 and a PET:PA ratio of 1.93, and yielded a digested polyol (Polyol No. 4) having a free EG content of 2.9%, a free DEG content of 9.4%, an equivalent weight of 176, and a viscosity of 7800 cps at 25° C.

EXAMPLE 2

This example illustrates the use of various conventional surfactants for compatibilizing blends of the fluorocarbon R-11 (monofluorotrichloromethane) and an aromatic polyester polyol (Polyol No. 3 of Example 1).

Each sample was prepared by blending 20 parts of the compatibilizer into 80 parts of the polyol, and then adding 30 parts of the fluorocarbon to the compatibilizer/polyol mixture. This formulation contains compatibilizer at a level of 20% of the two hydroxyl group-containing ingredients and overall 23% fluorocarbon. The samples were maintained at room temperature and their storage stability was visually assessed. The results are reported in the following Table I.

The conventional low molecular weight surfactants of Table I contain hydrophobic groups (alkyl or alkylaryl) in combination with a hydrophilic segment comprising polyoxyethylene (EO). These surfactants failed to stabilize the polyol/R-11 mixture.

TABLE I

STABILITY OF POLYOL BLENDS CONTAINING 20% COMPATIBILIZER AND 23% R-11

| COMPATIBILIZER UTILIZED | DESCRIPTION | SUPPLIER | STABILITY* |
|---|---|---|---|
| Triton X-100 | Octyl Phenoxy-Polyethoxy Ethanol | Rohm and Haas Co. | Separation |
| Triton N-150 | Nonyl Phenoxy-Polyethoxy Ethanol | " | " |
| Triton CF-10 | Alkyl Aryl Polyether | " | " |
| Trymeen TAM 20 | POE TAM-Tallow Amine | Emery Industries | " |
| Trydet 20 | POE-Tall Oil | " | Large Separation |
| Pegosperse 400 ML | POE 9 Monolaurate | Glyco Chemicals, Inc. | " |
| Flo Mo 36C | POE Castor Oil | Sellers Chemical Corp. | " |
| Poly-G 30-168 | Propoxylated Glycerin | Olin Corp. | Separation |
| Dipropylene Glycol | | | Hazy, Small Separation |

*The blends were stored at room temperature and observed for their appearance and separation of the fluorocarbon from solution.

EXAMPLE 3

This example illustrates the preparation and stability of a series of fluorocarbon/polyol blends by generally following the procedure of Example 2 and utilizing for each formulation 90 parts of Polyol No. 3, 30 parts of the fluorocarbon and 10 parts of the compatibilizers listed in the following Table II. The non-liquid compatibilizers were melted prior to blending with the polyol The Table II results show that the use of compatibilizer molecules containing both PO and EO blocks improves the fluorocarbon compatibility of the polyol blends At 10% compatibilizer and 23% R-11, Tetronics 1104 and 1304 and Pluronic P84 gave clear solutions. A comparison of the performance of Tetronics 504 and 1104, which have the same EO content (40%) but differ in size, shows that there is an increase in compatibilizer efficiency as the molecule increases in size from an 850 to a 2075 equivalent weight. While Pluronic P84 is a diol and Tetronic 1104 a tetrol, these compatibilizers have the same EO level and equivalent weight and are found to display a similar solubilizing influence. The effectiveness of the two compatibilizers thus appears to be unaffected by the difference in their molecular structures. However, the performance of polypropylene glycol, which gave separation of the blend, points to the need for EO in the molecule.

equivalent weights are virtually the same for Pluronics L43 and L35.

TABLE II
STABILITY OF POLYOL BLENDS CONTAINING 10% COMPATIBILIZER AND 23% R-11

| COMPATIBILIZER UTILIZED[1] | STRUCTURE | EQ. WT. | % EO | STABILITY[2] |
|---|---|---|---|---|
| Tetronic 504 | HO—[EO]—(PO)\ /(PO)—[EO]—OH <br> N—CH$_2$CH$_2$—N <br> HO—[EO]—(PO)/ \(PO)—[EO]—OH | 850 | 40 | Hazy, Separated |
| Tetronic 904 | " | 1875 | 40 | Hazy |
| Tetronic 1104 | " | 2075 | 40 | Clear |
| Tetronic 1304 | " | 2625 | 40 | Clear But Viscous |
| Pluronic P84 | HO—[EO]—(PO)—[EO]—OH | 2100 | 40 | Clear |
| Pluronic P2000 | Polypropylene Glycol | 1000 | 0 | Separation |

[1] All compatibilizers are available from BASF Wyandotte Corporation.
[2] The blends were stored at room temperature and observed for their appearance and separation of the fluorocarbon from solution.

EXAMPLE 4

Blends of Polyol No. 3 and R-11 were prepared substantially as described in the previous examples, employing as compatibilizers the EO/PO block copolymers listed in the following Table III and the levels of compatibilizer (20%) and R-11 (23%) of Example 1.

A comparison of Tables II and III reveals that the effectiveness of an EO/PO block copolymer of a given molecular size can be enhanced by increasing its concentration in the polyol/fluorocarbon blend. Tetronic 504 gave a stable solution at the 20% level (Table III) but caused separation at 10% (Table II).

The behavior of Pluronics L43, L44 and L35, as described in Table III, demonstrates the effect of increasing the EO level in the compatibilizer molecule. While the use of Pluronic L43, which has 30% EO, caused separation, the formulations containing Pluronics L44 (40% EO) and L35 (50% EO) were clear solutions with only small precipitates observed after 30 days. The Another factor determining compatibilizer efficiency is the position of the EO and PO portions of the block copolymer. As shown in Table III, Pluronic P84 and Tetronic 704 provided excellent stability whereas Pluronic 25R4 and Tetronic 704R gave separation. The difference between these surfactants is that the former effective ones have the PO blocks located inwardly of the EO blocks which are on the chain ends, while the latter ineffective surfactants have inner EO blocks with the PO blocks on the chain ends.

TABLE III
STABILITY OF POLYOL BLENDS CONTAINING 20% COMPATIBILIZER AND 23% R-11

| COMPATIBILIZER UTILIZED[1] | STRUCTURE | EQ. WT. | % EO | STABILITY[2] Initial | Aged |
|---|---|---|---|---|---|
| Pluronic L43 | HO—[EO]—(PO)—[EO]—OH | 925 | 30 | Large Separation | |
| Pluronic L44 | " | 1100 | 40 | Clear | Slight Ppt. After 30 Days |
| Pluronic L35 | " | 950 | 50 | " | Slight Ppt. After 30 Days |
| Pluronic P84 | " | 2100 | 40 | " | |
| Pluronic 25R4 | HO—(PO)—[EO]—(PO)—OH | 1900 | 40 | Large Separation | |
| Tetronic 504 | HO—[EO]—(PO)\ /(PO)—[EO]—OH <br> N—CH$_2$CH$_2$—N <br> HO—[EO]—(PO)/ \(PO)—[EO]—OH | 850 | 40 | Clear | |
| Tetronic 704 | " | 1375 | 40 | " | |
| Tetronic 1304 | " | 2625 | 40 | " | |
| Tetronic 1504 | " | 3125 | 40 | Hazy, Viscous | |
| Tetronic 704R | HO—(PO)—[EO]\ /[EO]—(PO)—OH <br> N—CH$_2$CH$_2$—N <br> HO—(PO)—[EO]/ \[EO]—(PO)—OH | 1375 | 40 | Large Separation | |

[1] All compatibilizers are available from BASF Wyandotte Corporation.
[2] The blends were stored at room temperature and observed for their appearance and separation of the fluorocarbon from solution.

EXAMPLE 5

This example further illustrates the increase in compatibilizer efficiency as the size of the compatibilizing molecule increases.

A series of fluorocarbon/polyol blends were prepared substantially as described in the previous examples, employing 75 parts of Polyol No. 2, 50 parts of fluorocarbon and 25 parts of the compatibilizers listed in the following Table IV. The fluorocarbon level for these blends is 33% versus 23% in the previous examples.

The excellent stability results listed in Table IV for Pluronics P65 and F77 and Tetronic 1104, which have equivalent weights of 1700 or greater and contain EO endcapping within the 40-70 weight % range, demonstrate the value of using high molecular weight compatibilizers with terminal ethylene oxide blocks. While the use of high concentrations of EO endcapped compatibilizers of lower equivalent weight will provide stabilization of the polyol/R-11 blends, the high equivalent weight compatibilizers are simply more efficient.

TABLE IV

STABILITY OF POLYOL BLENDS CONTAINING 25% COMPATIBILIZER AND 33% R-11

| COMPATIBILIZER UTILIZED[1] | STRUCTURE | EQ. WT. | % EO | STABILITY[2] INITIAL | AFTER 3 WEEKS |
|---|---|---|---|---|---|
| Pluronic L35 | Diol | 950 | 50 | Ppt. | — |
| Pluronic L44 | " | 1100 | 40 | Ppt. | — |
| Pluronic P65 | " | 1700 | 50 | Very clear | Clear |
| Pluronic F77 | " | 3300 | 70 | Hazy (thick) | Hazy |
| Tetronic 504 | Tetrol | 850 | 40 | Ppt. | — |
| Tetronic 704 | " | 1375 | 40 | Clear | Hazy and Suspension |
| Tetronic 1104 | " | 2075 | 40 | Clear | Clear |

[1]All compatibilizers are available from BASF Wyandotte Corporation.
[2]The blends were stored at room temperature and observed for their appearance and separation of the fluorocarbon from solution.

EXAMPLE 6

This example illustrates the effect on blend stability of varying the composition of the aromatic polyester polyol.

The fluorocarbon/polyol blends A-C of the following Table V were prepared substantially as described in the previous examples employing 75 parts of the polyols listed in the table, 50 parts of fluorocarbon and 25 parts of the compatibilizer Pluronic P65.

Polyol Nos. 1-3 of Table V are characterized by a low EG content and different DEG levels and equivalent weights. The best stability was obtained for Blend A, which contained a polyol of high equivalent weight and low DEG content. As shown in Table V, the stability decreased as the free DEG level increased.

TABLE V

EFFECT OF POLYESTER COMPOSITION ON BLEND STABILITY

| POLYOL NO. | BLEND A 1[1] | BLEND B 2[1] | BLEND C 3[1] |
|---|---|---|---|
| Eq. Wt. | 213 | 175 | 140 |
| % DEG | 4.9 | 12.4 | 19.7 |
| STABILITY[2] | | | |
| Initial | Very Clear | Very Clear | Clear |
| After 3 weeks | Very Clear | Clear | Slight Suspension |
| After 3 months | Clear | Slight Suspension | Suspension |

[1]Of Example 1.
[2]The blends were stored at room temperature and observed for their appearance and separation of the fluorocarbon from solution.

EXAMPLE 7

This example illustrates the use of Pluronics P65 and P75 (available from BASF Wyandotte Corporation) to stabilize blends of fluorocarbon and a commercial aromatic polyester polyol mixture supplied by Hercules Inc. under the trademark "Terate 203."

Fluorocarbon/polyol blends A–O of the following Tables VIA and VIB were prepared substantially as described in the previous examples. The quantities of the blended ingredients and blend stabilities and viscosities are shown in the tables.

Blends C, H, K, N and O of the tables were stable. The blends (C and H) stabilized by Pluronic P65 had lower viscosities than the respective blends (K and O) of the same composition stabilized by Pluronic P75. However, Pluronic P75 appears to be more efficient since, at 5% compatibilizer/20% R-11, blend J had a small separation while the comparable Blend B stabilized by Pluronic P65 underwent a large separation. At 15% Pluronic P65/25% R-11, Blend F separated whereas the comparable Blend N stabilized by Pluronic P75 remained stable. These results again reflect the improvement in stabilizing capacity resulting from an increase in compatibilizer molecular weight at constant EO level.

TABLE VIA

BLENDS OF R-11 AND TERATE 203 WITH PLURONIC P65

| | BLENDS | | | | | | | | |
|---|---|---|---|---|---|---|---|---|---|
| | A | B | C | D | E | F | G | H | I |
| Ingredients (pts. by wt.) | | | | | | | | | |
| Terate 203[1] | 240 | 228 | 216 | 202.5 | 189 | 191 | 178.5 | 180 | 168 |
| Pluronic P65[2] | — | 12 | 24 | 22.5 | 21 | 34 | 31.5 | 45 | 42 |
| R-11 | 60 | 60 | 60 | 75 | 90 | 75 | 90 | 75 | 90 |
| Polyol Blend Eq. Wt. | 190 | 199 | 208.5 | 208.5 | 208 | 219.5 | 219 | 231 | 231 |
| % Compatibilizer of Polyols | 0 | 5 | 10 | 10 | 10 | 15 | 15 | 20 | 20 |
| % R-11 of blend | 20 | 20 | 20 | 25 | 30 | 25 | 30 | 25 | 30 |

TABLE VIA-continued

BLENDS OF R-11 AND TERATE 203 WITH PLURONIC P65

| | BLENDS | | | | | | | | |
|---|---|---|---|---|---|---|---|---|---|
| | A | B | C | D | E | F | G | H | I |
| Stability[3] | | | | | | | | | |
| Initial | Stable | Large Separation | Stable | Separated | Separated | Separated | Separated | Stable | Separated |
| After 3 Months | Large Separation | — | No Separation | — | — | — | — | No Separation | — |
| Viscosity, cps, 20° C. | — | — | 3000 | | | | | 1275 | — |

[1]Terate 203 has an equivalent weight of 190 and 10–12% DEG.
[2]Pluronic P65 is a diol of 1700 equivalent weight whose two chain ends are EO blocks constituting 50% by weight of the diol.
[3]The blends were stored at room temperature and observed for their appearance and separation of the fluorocarbon from solution.

TABLE VIB

BLENDS OF R-11 AND TERATE 203 WITH PLURONIC P75

| | BLENDS | | | | | |
|---|---|---|---|---|---|---|
| | J | K | L | M | N | O |
| Ingredients (pts. by wt.) | | | | | | |
| Terate 203[1] | 228 | 216 | 213.8 | 202.5 | 191 | 180 |
| Pluronic P75[2] | 12 | 24 | 11.2 | 22.5 | 34 | 45 |
| R-11 | 60 | 60 | 75 | 75 | 75 | 75 |
| Polyol Blend Eq. Wt. | 199 | 209 | 199 | 208.5 | 220 | 232 |
| % Compatibilizer of Polyols | 5 | 10 | 5 | 10 | 15 | 20 |
| % R-11 of blend | 20 | 20 | 25 | 25 | 25 | 25 |
| Stability[3] | | | | | | |
| Initial | Small Separation | Stable | Separated | Separated | Stable | Stable |
| After 3 Months | — | No Separation | — | — | No Separation | No Separation |
| Viscosity, cps, 20° C. | — | 5250 | — | — | 3000 | 5180 |

[1]Terate 203 has an equivalent weight of 190 and 10–12% DEG.
[2]Pluronic P75 is a diol of 2075 equivalent weight whose two chain ends are EO blocks constituting 50% by weight of the diol.
[3]The blends were stored at room temperature and observed for their appearance and separation of the fluorocarbon from solution.

EXAMPLE 8

This example illustrates the preparation and stability of fluorocarbon/polyol blends containing an aromatic polyester polyol and a polyether polyol of high functionality.

Fluorocarbon/polyol blends A–E of the following Table VII were prepared substantially as described in the previous examples, the polyester and polyether polyols being mixed together before addition of the compatibilizer. Tetronics 707 (70% EO) and 1102 (20% EO) and Pluronic P65 (50% EO) were used as compatibilizers (all available from BASF Wyandotte Corporation). The quantities of the blended ingredients and blend stabilities are shown in the table.

As shown in Table VII, the use of Tetronics 707 and 1102 at a 15% level failed to yield stable premixes. However, reasonably stable premixes (C and D) were obtained using 20–25% of Pluronic P65, with only small suspensions being observed after 100 days storage.

TABLE VII

STABILITY OF POLYOL BLENDS HAVING HIGH FUNCTIONALITY

| | BLENDS | | | | |
|---|---|---|---|---|---|
| | A | B | C | D | E |
| INGREDIENTS (pts. by wt.) | | | | | |
| Polyol No. 2[1] | 64 | 64 | 56 | 60 | 64 |
| Sucrose/glycerin polyether[2] | 21 | 21 | 19 | 20 | 21 |
| Tetronic 707[3] | — | 15 | — | — | — |
| Tetronic 1102[3] | 15 | — | — | — | — |
| Pluronic P65[3] | — | — | 25 | 20 | 15 |
| R-11 | 50 | 50 | 50 | 50 | 50 |
| STABILITY[4] | | | | | |
| Initial | Ppt. | Ppt. | Very Clear | Very Clear | Very Hazy |
| After 100 days | — | — | Small Suspension | Small Suspension | — |

[1]Of Example 1.
[2]Polyol has an equivalent weight of 126 and average functionality of 5, and is supplied by the Dow Chemical Company under the trade name Voranol 446.
[3]The chain ends of each compatibilizer are EO blocks.
[4]The blends were stored at room temperature and observed for their appearance and separation of the fluorocarbon from solution.

EXAMPLE 9

This example compares the use of single compatibilizing agents with the use of a mixture of compatibilizing agents of U.S. Pat. No. 4,529,744 for stabilizing blends of fluorocarbon and a polyester polyol.

Fluorocarbon/polyol blends A–F of the following Table VIII were prepared substantially as described in the previous examples. In the case of Blends E and F, the polyester polyol and diethylene glycol were mixed together before addition of the compatibilizers and compatibilizer, respectively. The quantities of the blended ingredients and blend stabilities are shown in the table.

As shown in Table VIII, Pluronics P65 and P75, which are diols having a terminal ethylene oxide block at both chain ends, were significantly superior to the other compatibilizing agents. Blends B, C and F prepared with the respective Pluronics were clear and highly workable (low viscosity) solutions. On the other hand, the single compatibility agents "Varonic K-215" (described in Example S of U.S. Pat. No. 4,529,744) and "Tergitol XH" (described in Example I of the same patent), failed to match the performance of the Pluronics. Furthermore, while separation occurred in the case of Blend A containing Varonic K-215, Tergitol XH provided a stable solution which, however, was extremely viscous and hence difficultly workable. Significantly, the latter compatibilizer is an EO/PO block copolymer which, with a 2400–3500 molecular weight and 50 weight % EO content, represents an "isomer" of Pluronic P65, i.e., the molecular weight and EO/PO levels are the same but Tergitol XH has only one terminal EO block instead of two as in Pluronic P65. Accordingly, it is found that, while the EO/PO block copolymer having one terminal EO block outperforms the alkoxylated amine diol (Varonic K-215), still greater efficiency results when all chain ends are EO blocks. This superior stabilization efficiency of an EO/PO copolymer with exclusively oxyethylene chain ends is again demonstrated by the stability of Blend F, which contains Pluronic P65, as compared with the instability of Blend E, which contains a combination of compatibility r agents in accordance with U.S. Pat. No. 4,529,744.

TABLE VIII

STABILITY OF POLYOL BLENDS

| | BLENDS | | | | | |
|---|---|---|---|---|---|---|
| | A | B | C | D | E | F |
| INGREDIENTS (pts. by wt.) | | | | | | |
| Polyol No. 2[1] | 50 | 50 | 50 | 50 | 37.2 | 37.2 |
| Varonic K-215[2] | 16.7 | — | — | — | 10 | — |
| Pluronic P65 | — | 16.7 | — | — | 5 | 15 |
| Pluronic P75 | — | — | 16.7 | — | — | — |
| Tergitol XH[3] | — | — | — | 16.7 | — | — |
| Diethylene Glycol | — | — | — | — | 8.3 | 8.3 |
| R-11 | 33.3 | 33.3 | 33.3 | 33.3 | 31.5 | 31.5 |
| STABILITY[4] | | | | | | |
| Initial | Separation | Clear with Low Viscosity | Clear with Slight Haze and Low Viscosity | Hazy but Stable and Extremely Viscous | Separation | Clear with Low Viscosity |

[1] Of Example 1.
[2] This compatibilizer is an alkoxylated amine diol available from Sherex Chemical Company.
[3] This compatibilizer is an ethoxylated propoxylated butanol available from Union Carbide Company.
[4] The blends were stored at room temperature and observed for their appearance and separation of the fluorocarbon from solution.

EXAMPLE 10

This example illustrates the preparation and stability of fluorocarbon/polyol blends which additionally contain catalyst and fire retardant additives.

Fluorocarbon/polyol blends A–J of the following Table IX were prepared substantially as described in the previous examples, except that the catalyst and, in the case of Blends G and I, the fire retardant, were blended into the polyol before the addition of fluorocarbon. The blended ingredients and quantities thereof, and the stability of each blend are shown in Table IX.

The data presented in Table IX demonstrates that compatibilizing efficiency increases with increasing EO content. Tetronic 1104, a 40% EO tetrol, gave a hazy solution when combined with Polyol No. 1, a polyol having a low DEG content, while Tetronic 1502, a 20% EO tetrol of about the same equivalent weight as Tetronic 1104, caused separation. Also, Pluronic P85, which contains 50% EO, gave a clear solution (Blends D and H). Clear solutions again were obtained when a fire retardant was added to Polyol Blends G and I although these blends turned hazy and precipitated after 7 days. The results for Blend J show that EG (Polyol No. 4 contains 2.9% EG) adversely affects blend stability. The blend initially was hazy and a precipitate formed after 1 week. Comparison of the results for Blend J with those of the other blends of the table having less than 0.5% EG points to the advantage of removing EG for improving the stability of the blend.

TABLE IX

STABILITY OF POLYOL BLENDS

| | BLENDS | | | | | | | | | |
|---|---|---|---|---|---|---|---|---|---|---|
| | A | B | C | D | E | F | G | H | I | J |
| INGREDIENTS | | | | | | | | | | |
| Polyol[1] No. | 1 | 1 | 1 | 1 | 1 | 2 | 2 | 2 | 2 | 4 |
| Wt. | 53 | 56 | 53 | 53 | 53 | 53 | 45 | 53 | 45 | 53 |
| Compatibilizer[2] | T-1104 | T-1104 | T-1502 | P-85 | T-1104/T-707 | T-1104 | T-1104 | P-85 | P-85 | T-1104 |
| Wt. | 13 | 10 | 13 | 13 | 6.5/6.5 | 13 | 11 | 13 | 11 | 13 |
| Fire Retardant[3] Wt. | — | — | — | — | — | — | 10 | — | 10 | — |
| Catalyst[4] Wt. | 4 | 4 | 4 | 4 | 4 | 4 | 4 | 4 | 4 | 4 |
| R-11 Wt. | 30 | 30 | 30 | 30 | 30 | 30 | 30 | 30 | 30 | 30 |

TABLE IX-continued

| STABILITY OF POLYOL BLENDS | | | | | | | | | |
|---|---|---|---|---|---|---|---|---|---|
| BLENDS | | | | | | | | | |
| A | B | C | D | E | F | G | H | I | J |

Stability[5]
| | | | | | | | | | |
|---|---|---|---|---|---|---|---|---|---|
| Initial | Hazy | Hazy | Ppt. | Very Clear | Ppt. | Very Clear | Very Clear | Very Clear | Very Clear | Very Hazy |
| After 7 days | Very Hazy | Very Hazy | — | Slightly Hazy | — | Slightly Hazy | Slightly Hazy | Slightly Hazy | Ppt. | Ppt. |

[1]Of Example 1.
[2]All compatibilizers are EO/PO block copolymers with terminal EO blocks and are available from BASF Wyandotte Corporation. In compatibilizer designations, T = Tetronic and P = Pluronic.
[3]Fire retardant is tris(2-chloropropyl) phosphate.
[4]Catalyst is a blend of 2,4,6-tris(dimethylaminomethyl)phenol:potassium sylvatate:DEG in a 5.5:43:51.5 weight ratio. Potassium sylvatate was prepared from Sylvatal 40, a tall oil fatty acid/resin acid blend available from SCM Corporation.
[5]The blends were stored at room temperature and observed for their appearance and separation of the fluorocarbon from solution.

EXAMPLE 11

This example illustrates the use of Tetronic 1104 at the 10-20% level to stabilize polyol/R-11 blends which additionally contain catalyst and fire retardant additives.

Fluorocarbon/polyol blends A-H of the following Table X were prepared substantially as described in Example 10. Blends containing two different catalysts were prepared. The quantities of the blended ingredients and blend stabilities are shown in the table.

As shown in Table X, the incorporation of either catalyst in the blend resulted in the same stability. Addition of the fire retardant at the 10% level yielded clear solutions after mixing, but these blends formed precipitates after 9 days storage. Blend H of the table verifies the need for the compatibilizer.

EXAMPLE 12

This example illustrates the use of Tetronic 1104 and Pluronic P65 at the 25% level to stabilize polyol/R-11 blends which additionally contain catalyst and fire retardant additives.

Fluorocarbon/polyol blends A-E of the following Table XI were prepared substantially as described in Examples 10 and 11. The quantity of compatibilizer in the polyol blend was increased from the 10-20% level of the previous examples to 25%. The quantities of the blended ingredients and blend stabilities are shown in Table XI.

Comparison of Tables X and XI reveals that blend stability improved with the increased concentration of compatibilizer. Without fire retardant, Blend A remained Clear after storage. Even with 15% fire retar-

TABLE X

| STABILITY OF POLYOL BLENDS | | | | | | | | |
|---|---|---|---|---|---|---|---|
| BLENDS | | | | | | | | |
| | A | B | C | D | E | F | G | H |
| INGREDIENTS (pts. by wt.) | | | | | | | | |
| Polyol No. 3[1] | 51 | 54 | 58 | 54 | 58 | 46 | 49 | 46 |
| Tetronic 1104 | 13 | 10 | 7 | 10 | 7 | 8 | 5 | — |
| Tris(2-chloroethyl) phosphate | — | — | — | — | — | 10 | 10 | 10 |
| Catalyst I[2] | 6 | 6 | 6 | — | — | — | — | — |
| Catalyst II[3] | — | — | — | 6 | 6 | 6 | 6 | 6 |
| R-11 | 30 | 30 | 30 | 30 | 30 | 30 | 30 | 30 |
| STABILITY[4] | | | | | | | | |
| Initial | Clear | Clear | Emulsion | Clear | Clear | Clear | Clear | Separation |
| After 9 days | Clear | Clear | Ppt. formed | Slight Haze | Hazy | Ppt. Formed | Ppt. Formed | |

[1]Of Example 1.
[2]Catalyst I is a blend of 2,4,6-tris(dimethylaminomethyl)phenol:potassium-2-ethyl hexoate:DEG in a 7.7:32:59 weight ratio.
[3]Catalyst II is a blend of 2,4,6-tris(dimethylaminomethyl)phenol:potassium sylvatate:DEG in a 5.5:43:51.5 weight ratio. Potassium sylvatate was prepared from Sylvatal 40, a tall oil fatty acid/resin acid blend available from SCM Corporation.
[4]The blends were stored at room temperature and observed for their appearance and separation of the fluorocarbon from solution.

dant, Blends B-E formed only small suspensions after storage. As in Example 11, the blend (C) without compatibilizer separated after mixing.

TABLE XI

| STABILITY OF POLYOL BLENDS | | | | | |
|---|---|---|---|---|---|
| BLENDS | | | | | |
| | A | B | C | D | E |
| INGREDIENTS (pts. by wt.) | | | | | |
| Polyol No. 2[1] | 49 | 37.5 | 50 | 37.5 | 37.5 |
| Tetronic 1104 | 16 | 12.5 | — | — | — |
| Pluronic P65 | — | — | — | 12.5 | — |
| Pluronic P75 | — | — | — | — | 12.5 |
| Tris(2-chloroethyl) phosphate | 7 | 7 | 7 | 7 | 7 |
| Catalyst[2] | — | 15 | 15 | 15 | 15 |

TABLE XI-continued

STABILITY OF POLYOL BLENDS

| | BLENDS | | | | |
|---|---|---|---|---|---|
| | A | B | C | D | E |
| R-11 | 28 | 28 | 28 | 28 | 28 |
| STABILITY[3] | | | | | |
| Initial | Very Clear | Very Clear | Separation | Very Clear | Very Clear |
| After 3 weeks | Very Clear | Clear Solution and Ppt. | — | Slight Suspension | Slight Suspension |

[1]Of Example 1.
[2]Catalyst is a blend of 2,4,6-tris(dimethylaminomethyl)phenol:potassium-2-ethyl hexoate:DEG in a 7.7:32:59 weight ratio.
[3]The blends were stored at room temperature and observed for their appearance and separation of the fluorocarbon from solution.

EXAMPLE 13

This example illustrates the synthesis of polyisocyanurate foams utilizing Tetronic 1104 and Pluronic P85 as compatibilizers.

A. Foam System Without Flame Retardant

In each foam preparation, the ingredients of the following Table XII were added to the reaction vessel at ambient temperature and in the quantities listed in the table. The levels of compatibilizer and fluorocarbon were 20% and 28–30%, respectively. First, a polyol premix of the aromatic polyester polyol, compatibilizer and catalyst was poured into the reactor. Freon 11 was then added to the vessel, and all ingredients were mixed at 1000 rpm for ca. 10 seconds. Lastly, the isocyanate was introduced and all ingredients were mixed at 3500 rpm for 15 seconds, and thereafter poured into a box to yield a rigid polyisocyanurate foam.

Various characteristics of the polyisocyanurate foams produced are shown in Table XII. The friability was low for all foams, and the oxygen index remained unchanged despite changes in % trimer and NCO/OH index of the foams. Also, the thermal conductivity values were about the same in each case. These foam systems required no surfactant because of the large amount of compatibilizer present. The EO/PO polyols provide sufficient surfactant activity to stabilize the foam cells and to entrap the R-11.

At the bottom of Table XII, dimensional stability results are shown for MONDUR MR, the polyisocyanate used in preparing Foam A–D of the table, and for comparable foams made from the same formulation of the table except that the 100 parts of MONDUR MR was replaced by 100 parts of MONDUR MR-200 in each case. The volume growth depended on the trimer level and the type of isocyanate. As % trimer increased, the volume growth decreased. In addition, the use of the isocyanate of higher functionality MONDUR MR-200 reduced the volume growth at all % trimer levels.

TABLE XII

FOAM EVALUATION OF COMPATIBILIZERS (WITHOUT FLAME RETARDANT)

| | FOAM | | | |
|---|---|---|---|---|
| | A | B | C | D |
| INGREDIENTS (pts. by wt.) | | | | |
| Polyol[1] No. 3 | 54.8 | — | — | — |
| Polyol[1] No. 2 | — | 52.8 | 52.8 | — |
| Polyol[1] No. 1 | — | — | — | 52.8 |
| Tetronic 1104 | 13.7 | 13.2 | — | — |
| Pluronic P85 | — | — | 13.2 | 13.2 |
| Polyol Blend Eq. Wt. | 172 | 214 | 215 | 260 |
| Catalyst[2] | 7 | 4 | 4 | 4.3 |
| R-11 | 28 | 30 | 30 | 30 |
| Polymethylene Polyphenyl Isocyanate[3] | 100 | 100 | 100 | 100 |
| % Trimer[4] | 8.6 | 11.4 | 11.4 | 12.3 |
| NCO/OH Index[5] | 190 | 240 | 240 | 295 |
| FOAM PROPERTIES | | | | |
| Cream Time, sec. | 21 | 28 | 29 | 17 |
| Firm Time, sec. | 42 | 66 | 68 | 55 |
| Density, pcf | 1.55 | 1.5 | 1.5 | 1.5 |
| Oxygen Index[6] | 22.3 | 21.9 | 22.3 | 22.6 |
| Friability[7], % wt. loss | 5 | 8 | 4 | 6 |
| k-Factor[8], initial | .137 | .138 | .135 | .142 |
| Dimensional Stability[9] | | | | |
| % Δ Vmax at | | | | |
| 70° C., 95% RH | | | | |
| MONDUR MR | 34 | 16 | 17 | 10 |
| MONDUR MR-200 | 22 | 12 | 13 | 9 |

Footnotes to Table XII.
[1]Of Example 1.
[2]Catalyst is a blend of 2,4,6-tris(dimethylaminomethyl)phenol:potassium sylvatate:-DEG in a 5.5:43:51.5 weight ratio.
[3]Isocyanate has an equivalent weight of 134 and a viscosity of 150 centipoises at 25° C., and is available from the Mobay Chemical Company, Pittsburgh, Pa. under the tradename MONDUR MR.

[4]$\% \text{ Trimer} = \frac{(\text{No. of equivalents of isocyanate} - \text{No. of equivalents of polyol})}{(\text{Wt. of isocyanate} + \text{Wt. of polyol})} \times 4200$

[5]NCO/OH Index = (Eq. NCO/Eq.OH) × 100.
[6]Flammability test conducted according to ASTM D-2863-70, except that a sample measuring $\frac{1}{4}" \times \frac{1}{4}" \times 6"$ was used.
[7]According to ASTM Test Method C-421.
[8]Units = Btu-in/hr-ft$^2$-°F.
[9]According to ASTM Test Method D 2126.

EXAMPLE 13 (Continued)

B. Foam System With Flame Retardant

Foams A and B of the following Table XIII were prepared substantially as described in Example 13A, utilizing the quantities of ingredients listed in Table XIII and including tris(2-chloropropyl)phospate, a flame retardant, in the polyol premix added to the reactor in the first step.

Various characteristics of the polyisocyanurate foams produced are shown in Table XIII. The inclusion of the non-reactive flame retardant and accompanying reduction in level of the aromatic polyester polyol in the formulations raised the trimer content, with a resultant increase in oxygen index of the foams. As shown in the table, the addition of 15 parts of flame retardant to the premix resulted in a 27.3 oxygen index at 13.5–14% trimer. The foams had suitably low friability and k-factor values. As in the case of the above-described foams containing no flame retardant, use of the higher functionality isocyanate provided the foam (F) having the better dimensional stability, and the compatibilizer again functioned as a surfactant.

TABLE XIII

FOAM EVALUATION OF COMPATIBILIZER (WITH FLAME RETARDANT)

|  | FOAM | |
| --- | --- | --- |
|  | E | F |
| INGREDIENTS (pts. by wt.) | | |
| Polyol[1] No. 2 | 40 | 40 |
| Tetronic 1104 | 13.2 | 13.2 |
| Tris(2-chloropropyl) phosphate | 15 | 15 |
| Catalyst[2] | 4 | 4 |
| R-11 | 28 | 28 |
| MONDUR MR | 100 | — |
| MONDUR MR-200 | — | 100 |
| % Trimer[3] | 14 | 13.5 |
| NCO/OH Index[4] | 320 | 310 |
| PREMIX STABILITY[5] | | |
| Initial | Clear | Clear |
| After 50 days | Ppt. Formed | Ppt. Formed |
| FOAM PROPERTIES | | |
| Cream Time, sec. | 17 | 19 |
| Firm Time, sec. | 40 | 47 |
| Density, pcf | 1.77 | 1.72 |
| Oxygen Index[6] | 27.3 | 27.3 |
| Friability[7], % wt. loss | 7 | 11 |
| k-Factor[8], initial | .140 | .138 |
| Dimensional Stability,[9] % Δ Vmax at 70° C., 95% RH | 14.5 | 9.5 |

We claim:

1. A miscible blend for use in the manufacture of polyisocyanurate and polyurethane foams comprising:
   (a) about 10 to 50 percent by weight of a halogenated organic blowing agent, and
   (b) about 90 to 50 percent by weight of a polyol component comprising:
      (1) about 10 to 95 percent by weight of a polyester polyol,
      (2) about 1 to 50 percent by weight of a compatibilizer consisting essentially of a polyoxyalkylene polyol of the formula

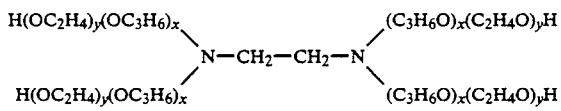

wherein x is sufficiently large to provide a molecular weight of the oxypropylene chains of at least about 250 and wherein y is sufficiently large to provide about 10 to 90% of the total molecular weight of the compound,
      (3) about 0 to 35 percent by weight of an alkylene glycol having the formula

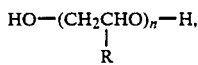

wherein R is hydrogen or lower alkyl of one to four carbon atoms and n is from 1 to 10, and
      (4) about 0 to 70 percent by weight of at least one other polyether polyol.

2. The miscible blend of claim 1 wherein block copolymer (2) comprises a reaction product of ethylene oxide and 1,2-propylene oxide, n is from 2 to 10, and polyether polyol (4) has a functionality of at least 3.

3. The miscible blend of claim 2 wherein the halogenated organic blowing agent is a fluorocarbon and polyester polyol (1) is an aromatic polyester polyol.

4. The miscible blend of claim 3 wherein block copolymer (2) has an average equivalent weight from about 500 to 7000 and from about 10 to 90 percent by weight of terminal oxyethylene units.

5. The miscible blend of claim 3 which additionally contains a catalyst and optionally a surfactant.

6. The miscible blend of claim 3 wherein block copolymer (2) has a molecular weight in the range of about 1000 to 27,000.

7. The miscible blend of claim 6 wherein block copolymer (2) has an average equivalent weight from about 1500 to 2500 and from about 40 to 70 percent by weight of terminal oxyethylene units.

8. The miscible blend of claim 3 wherein polyester polyol (1) and alkylene glycol (3) comprise a polyol mixture selected from the group consisting of
   (a) a mixture prepared by the transesterification, with at least one alkylene glycol (3) of claim 3, of a residue remaining after dimethyl terephthalate and methyl p-toluate have been removed from a dimethyl terephthalate esterified oxidate reaction product, the major portion of said residue comprising a mixture of methyl and benzyl esters of benzene and biphenyl di- and tricarboxylic acids,
   (b) a mixture prepared by the transesterification, with at least one alkylene glycol (3) of claim 3, of a by-product fraction from the manufacture of dimethyl terephthalate, the major portion of said fraction comprising about 15 to 70 weight percent of dimethyl terephthalate, and about 85 to 30 weight percent of a mixture of monomethyl terephthalate, bi-ring esters and polymeric materials,
   (c) a mixture prepared by digesting polyalkylene terephthalate with a digesting medium comprising a polycarboxylic acid component-containing glycol derived from the polycarboxylic acid component and at least one alkylene glycol (3) of claim 3,
   (d) a mixture prepared by (i) digesting polyethylene terephthalate with a digesting medium comprising a polycarboxylic acid component-containing glycol derived from the polycarboxylic acid component and at least one alkylene glycol (3) of claim 3, and (ii) distilling from the digested polyol mixture the amount of liberated ethylene glycol sufficient for improved storage stability of the mixture, and
   (e) mixtures thereof.

9. The miscible blend of claim 8 wherein the polyol mixture includes alkylene glycol (3) added after preparation (a), (b), (c) or (d).

10. A polyol blend composition comprising
   (a) about 10 to 95 percent by weight of a polyester polyol,
   (b) about 1 to 50 percent by weight of a compatibilizer consisting essentially of a polyoxyalkylene polyol of the formula

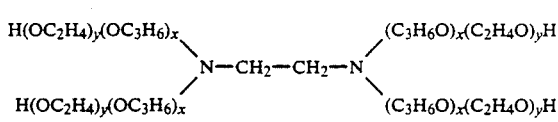

wherein x is sufficiently large to provide a molecular weight of the oxypropylene chains of at least about 250 and wherein y is sufficiently large to provide about 10 to 90% of the total molecular weight of the compound,
(c) about 0 to 35 percent by weight of an alkylene glycol having the formula

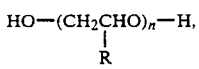

where R is hydrogen or lower alkyl of one to four carbon atoms and n is from 1 to 10, and
(d) about 0 to 70 percent by weight of at least one other polyether polyol.

11. In a process for the preparation of a polyisocyanurate foam, said process comprising bringing together under foam-forming conditions an organic polyisocyanate, a blowing agent, a trimerization catalyst, and a minor amount of a polyol component, the improvement comprises utilizing a blend comprising:
(a) about 10 to 50 percent by weight of a halogenated organic blowing agent, and
(b) about 90 to 50 percent by weight of a polyol component comprising:
(1) about 10 to 95 percent by weight of a polyol,
(2) about 1 to 50 percent by weight of a compatibilizer consisting essentially of a polyoxyalkylene polyol of the formula

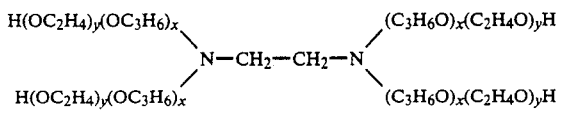

wherein x is sufficiently large to provide a molecular weight of the oxypropylene chains of at least about 250 and wherein y is sufficiently large to provide about 10 to 90% of the total molecular weight of the compound,
(3) about 0 to 35 percent by weight of an alkylene glycol having the formula

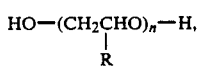

wherein R is hydrogen or lower alkyl of one to four carbon atoms and n is from 1 to 10, and
(4) about 0 to 70 percent by weight of at least one other polyether polyol.

12. The process of claim 11 wherein block copolymer (2) comprises a reaction product of ethylene oxide and 1,2-propylene oxide, n is from 2 to 10, and polyether polyol (4) has a functionality of at least 3.

13. The process of claim 12 wherein the halogenated organic blowing agent is a fluorocarbon and polyester polyol (1) is an aromatic polyester polyol.

14. The process of claim 13 wherein block copolymer (2) has an average equivalent weight from about 500 to 7000 and from about 10 to 90 percent by weight of terminal oxyethylene units.

15. The process of claim 13 wherein block copolymer (2) has a molecular weight in the range of about 1000 to 27,000.

16. The process of claim 15 wherein block copolymer (2) has an average equivalent weight from about 1500 to 2500 and from about 40 to 70 percent by weight of terminal oxyethylene units.

17. The polyisocyanurate foam produced by the process of claim 11.

18. In a process for the preparation of a polyurethane foam, said process comprising bringing together under foam-forming conditions an organic polyisocyanate, a blowing agent, a catalyst, and a polyol component, the improvement which comprises utilizing a blend comprising:
(a) about 10 to 50 percent by weight of a halogenated organic blowing agent, and
(b) about 90 to 50 percent by weight of a polyol component comprising:
(1) about 10 to 95 percent by weight of a polyester polyol,
(2) about 1 to 50 percent by weight of a compatibilizer consisting essentially of a polyoxyalkylene polyol of the formula

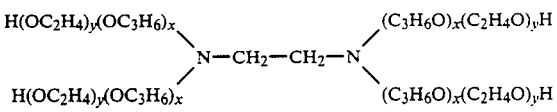

wherein x is sufficiently large to provide a molecular weight of the oxypropylene chains of at least about 250 and wherein y is sufficiently large to provide about 10 to 90% of the total molecular weight of the compound,
(3) about 0 to 35 percent by weight of an alkylene glycol having the formula

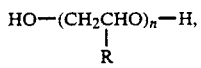

wherein R is hydrogen or lower alkyl of one to four carbon atoms and n is from 1 to 10, and
(4) about 0 to 70 percent by weight of at least one other polyether polyol.

19. The process of claim 18 wherein block copolymer (2) comprises a reaction product of ethylene oxide and 1,2-propylene oxide, n is from 2 to 10, and polyether polyol (4) has a functionality of at least 3.

20. The process of claim 19 wherein the halogenated organic blowing agent is a fluorocarbon and polyester polyol (1) is an aromatic polyester polyol.

21. The process of claim 20 wherein block copolymer (2) has an average equivalent weight from about 500 to 7000 and from about 10 to 90 percent by weight of terminal oxyethylene units.

22. The process of claim 20 wherein block copolymer (2) has a molecular weight in the range of about 1000 to 27,000.

23. The process of claim 22 wherein block copolymer (2) has an average equivalent weight from about 1500 to 2500 and from about 40 to 70 percent by weight of terminal oxyethylene units.

24. The polyurethane foam produced by the process of claim 18.

* * * * *